United States Patent
Gupta et al.

(10) Patent No.: US 10,582,467 B1
(45) Date of Patent: Mar. 3, 2020

(54) SECURE ENROLLMENT OF DEVICES WITH CLOUD PLATFORMS

(71) Applicant: NXP USA, Inc., Austin, TX (US)

(72) Inventors: Ruchika Gupta, Delhi (IN); Xuechen Yang, Austin, TX (US); Tiefei Zang, Austin, TX (US); Xuelin Shi, Beijing (CN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/161,760

(22) Filed: Oct. 16, 2018

(30) Foreign Application Priority Data

Aug. 17, 2018 (CN) .......................... 2018 1 0937428

(51) Int. Cl.
| | |
|---|---|
| *H04W 4/00* | (2018.01) |
| *H04W 60/00* | (2009.01) |
| *H04W 12/06* | (2009.01) |
| *H04W 12/08* | (2009.01) |
| *H04L 29/06* | (2006.01) |
| *H04W 84/12* | (2009.01) |

(52) U.S. Cl.
CPC ......... *H04W 60/00* (2013.01); *H04L 63/0428* (2013.01); *H04L 63/0823* (2013.01); *H04L 63/0876* (2013.01); *H04L 63/10* (2013.01); *H04W 12/06* (2013.01); *H04W 12/08* (2013.01); *H04L 2209/80* (2013.01); *H04W 84/12* (2013.01)

(58) Field of Classification Search
CPC ...................................................... H04W 60/00
See application file for complete search history.

(56) References Cited

U.S. PATENT DOCUMENTS

| | | | |
|---|---|---|---|
| 7,398,551 | B2 | 7/2008 | Thomas et al. |
| 2017/0180314 | A1* | 6/2017 | Walker ..................... G06F 21/00 |
| 2018/0316673 | A1* | 11/2018 | Shah .................... H04L 63/0892 |
| 2018/0338242 | A1* | 11/2018 | Li .......................... H04W 12/06 |

FOREIGN PATENT DOCUMENTS

EP          1529367 A1     5/2005

* cited by examiner

*Primary Examiner* — Justin Y Lee (57) ABSTRACT

A mechanism for secure enrollment of devices with a cloud platform is provided. This serves as a foundation for securing devices, such as edge computing and internet-of-things gateways, that can be provisioned and managed from the cloud. A public key infrastructure mechanism is provided for enrollment that is split into three phases. The first and second phases of the secure enrollment process authenticate the device and ensure that the device is within agreed to manufacturing limits for the device manufacturer. The third phase of the secure enrollment process provides a long-term operating certification to the device for cloud resource access.

15 Claims, 5 Drawing Sheets

SECURE ENROLLMENT OF DEVICES WITH CLOUD PLATFORMS

BACKGROUND

Field

This disclosure relates generally to cloud computing, and more specifically, to a mechanism for secure enrollment of devices with a cloud platform.

Related Art

Cloud computing provides upon shared computing resources rather than having local servers or personal devices to handle applications. Cloud computing enables convenient and on-demand network access to a shared pool of configurable computing resources (e.g., networks, servers, storage, applications, and services) that can be rapidly provisioned and released. Differing cloud-based services delivered through cloud computing resources include, for example, software as a service (SaaS) that provides access to software and its functions remotely as a Web-based service; platform as a service (PaaS) that provides a computing platform that can simplify the process of creating and deploying software; and, infrastructure as a service (IaaS) that provides IT infrastructure, such as servers, storage, and networking through the Internet.

Important to the cloud computing environment is a mechanism for ensuring that devices accessing the various services are enrolled to do so (e.g., for cloud-connected devices having embedded processors). Each device has an identifier that can be provisioned and managed from the cloud. Through the use of this identifier, the cloud system can determine those resources to which the device is entitled access. Typically, the identifier is in the form of a certificate where a private part of the certificate key is stored securely in the device while a public part is signed by a certificate authority. Enrollment involves getting the identifier in the form of a digital certificate to the device securely. The identifier can then be used to connect to cloud services.

Existing enrollment processes provide only a one-pass device authentication. Such one-pass authentication does not allow for authenticating devices based upon, for example, trusted producers, production quotas for device manufacturers, differing types of devices and device capabilities, and the like. It is desirable in a heterogeneous environment with many potential enrollee devices, such as IoT devices, to have such functionality.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism for secure enrollment of devices with a cloud platform. This serves as a foundation for securing devices, such as edge computing and internet-of-things gateways, that can be provisioned and managed from the cloud. A public key infrastructure (PKI) mechanism is provided for enrollment that is split into three phases. The first and second phases of the secure enrollment process authenticate the device and ensure that the device is within agreed to manufacturing limits for the device manufacturer. The third phase of the secure enrollment process provides a long-term operating certification to the device for cloud resource access.

As discussed above, traditional cloud computing provides a shared pool of configurable computing resources that can be provisioned and released for those nodes having access to those resources. But traditional cloud computing relies upon large amounts of data being transferred from and to the accessing nodes. This can consume time and networking resources unnecessarily. Thus, edge computing has been introduced as a way to reduce the flow of traffic from devices on the edge of the cloud (e.g., industrial networks that incorporate internet of things (IoT) devices) and provide near real-time local data analysis, while transferring only the data that needs to be transferred to the cloud resources. In one example of a typical edge-computing scenario, IoT devices transfer data gathered by those devices to a local, edge-computing device that includes compute, storage, and network resources in a small form factor. Data is processed at the edge, responded to appropriately, and only what is needed to be transferred to the cloud-based resources is transferred.

Figure 1:
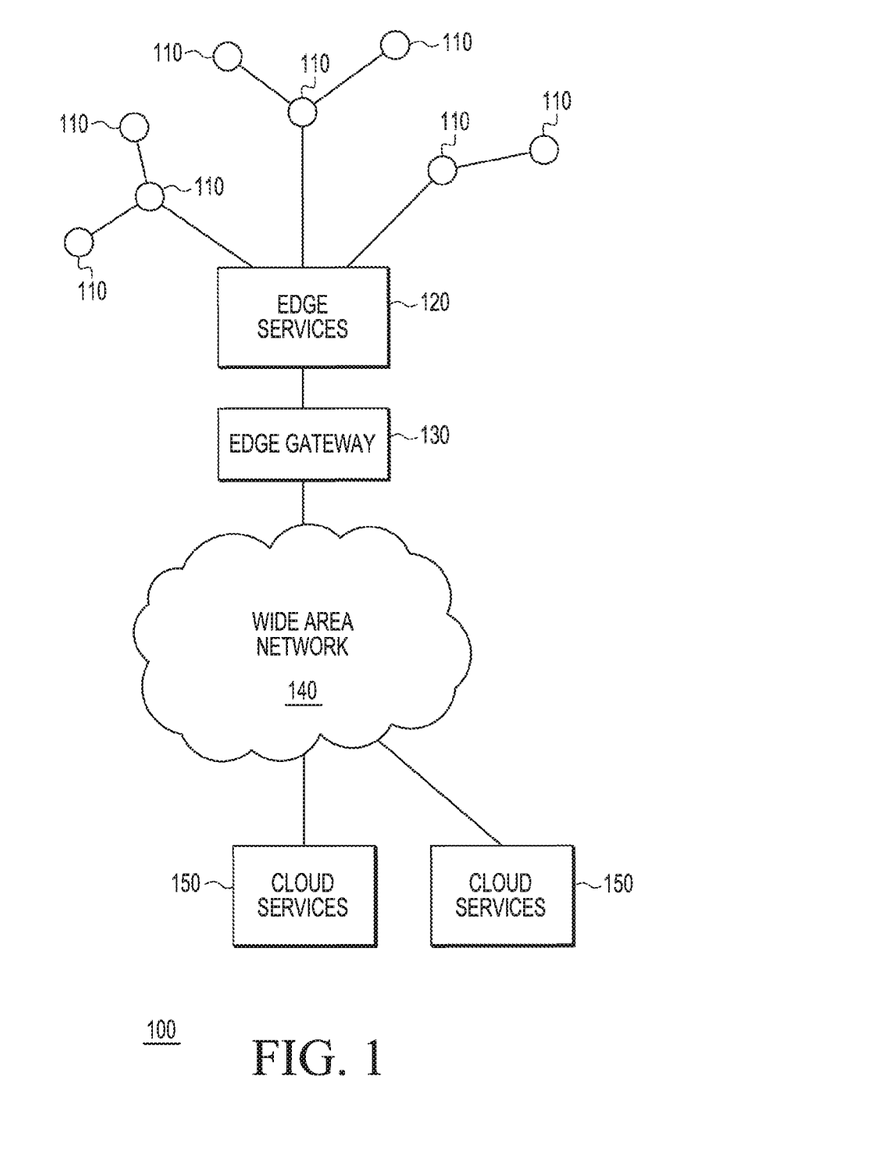
FIG. 1 is a simplified block diagram illustrating an example of an edge computing environment.

FIG. 1 is a simplified block diagram illustrating an example of an edge computing environment. Network nodes 110 and edge services node 120 all function in an edge network environment. Such an environment can be a local area network, an enterprise area network, a personal area network and the like. The edge network environment can be coupled to a wide area network 140 (e.g., the Internet) by an edge gateway 130. Coupled to the edge network environment by wide area network 140 are cloud services 150. These are accessible to the nodes in the edge network environment via network protocols known in the art.

Network nodes 110 can be, for example, internet of things (IoT) type devices that can provide distributed sensor and other apparatus functionality. These devices can be configured to gather data related to their environment. Either network nodes 110 or edge services node 120 can provide computation resources to analyze and respond to data gathered by network nodes 110 closer to where the data is generated than cloud services 150. This allows for quicker responses to such data, which can be especially important for environments gathering latency sensitive information (e.g., financial services, manufacturing, and medical). This also allows for locally filtering data to only provide to cloud services 150 data that is important or necessary. This can arise, for example, in an environment where large amounts of data is produced, but most of that data is inconsequential. In addition to utilizing cloud services 150 for centralized compute, storage, and other network applications, edge computing nodes such as network nodes 110 and edge services node 120 can also utilize the cloud services for firmware and software installation, updates, and configuration.

To restrict access to cloud services resources, device authentication mechanisms are used. One method to authenticate devices is using certificate-based authentication. A digital certificate (also known as a public key certificate or an identity certificate) is used to identify the device before granting access to a resource, network, application, and the like. A secure sockets layer/transport layer security (SSL/TLS) certificate is a type of digital certificate that binds ownership details of a server to cryptographic keys. The keys are used in SSL/TLS protocol communications to activate a secure session between a client and the server hosting the certificate. In order for a client to trust a SSL/TLS certificate, and establish a SSL/TLS session without security warnings, the SSL/TLS certificate should include the domain name of the server using it, and be issued by a trusted certificate authority (CA). The digital certificate is issued by a Certificate Authority (CA)—a trusted network node that is pre-authorized to issue SSL/TLS certificates.

Prior to issuing a digital certificate, a CA can check the identity of the requesting client. These checks relate to the class and type of certificate being requested. Devices can initially trust a CA by having a root certificate pre-installed in the device. A CA uses the root certificate to authorize issuance of certificates to the device. The CA will receive certificate requests, validate applications, issue certificates (e.g., SSL/TLS certificates), and publish ongoing validity status of issued certificates so servers relying on the certificate know that the certificate is still valid.

Figure 2:
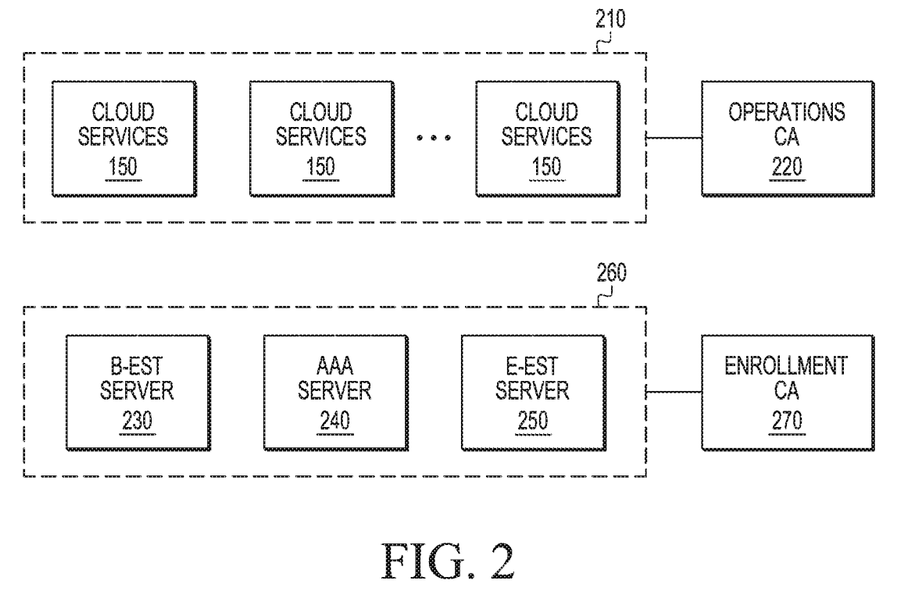
FIG. 2 is a simplified block diagram illustrating an example of a certificate authority trust infrastructure suitable for embodiments of the present invention.

FIG. 2 is a simplified block diagram illustrating an example of a certificate authority trust infrastructure suitable for embodiments of the present invention. Each certificate authority controls trusted access to a set of servers and services in the cloud. Embodiments of the present invention control enrollment to cloud services by having two separate trust areas—enrollment and operations—with each trust area governed by a separate certificate authority. Cloud services 150, as illustrated in FIG. 1, are in operations trust area 210, to which secure access is controlled by operations CA 220. An enrollment CA 270 controls secure access to enrollment trust area 260. As illustrated, enrollment trust area 260 includes a Bootstrapping Enrollment over Secure Transport (EST) server 230, an Association, Authentication, an Authorization server 240, and an Enrollment EST server 250. The functions of each of these enrollment trust area servers will be discussed in greater detail below.

By using separate enrollment and operations trust areas, embodiments of the present invention provide enhanced security for the operations servers. In addition, embodiments define a three-phase enrollment authentication that provides a high level of security by limiting distribution of security codes, while at the same time providing flexibility for devices with different architectures and capabilities.

Figure 3:
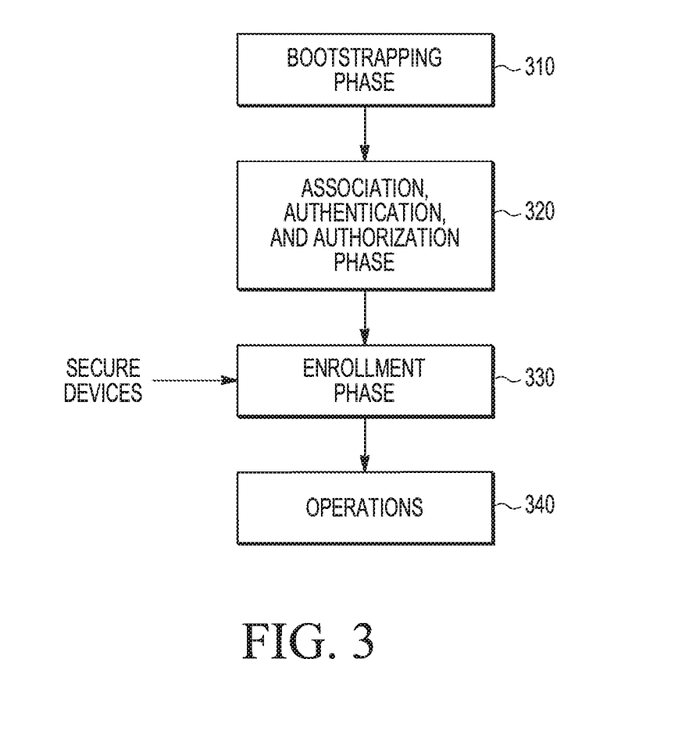
FIG. 3 is a simplified flow diagram illustrating the phases of the enrollment procedure provided by embodiments of the present invention.

FIG. 3 is a simplified flow diagram illustrating phases of the enrollment procedure provided by embodiments of the present invention. Phase 1 is a bootstrapping phase 310 that uses a pre-shared secret and enrollment server root CA certificate to acquire a temporary boostrapping certificate from Bootstrapping EST (B-EST) server 230. The pre-shared secret and enrollment server root CA certificate can be provided to device manufacturers and installed in the device during manufacturing.

Phase 2 is an association, authentication, and authorization phase (AAA) 320 that uses the bootstrapping certificate provided to the device in Phase 1 to establish a secure connection with AAA server 240. During this phase, device specific parameters such as manufacturer user ID, OEM user ID, device serial number, and the like, can be used to authenticate the device. If the device is authenticated, then a temporary authorization token can be issued to the device for further authentication.

Phase 3 is an enrollment phase 330 that uses the temporary authorization token to establish a secure connection with enrollment EST (E-EST) server 250. E-EST server will perform final authorization tasks and issue a long-term operation certificate that will allow the device to access services in operations trust area 210. As illustrated, there can be some devices that are securely manufactured and configured that can skip Phase 1 and Phase 2, and therefore interact directly with Phase 3 to gain access to the operations trust area. Finally, after completing the enrollment phase, devices can enter operations phase 340, accessing cloud services 150 served by operations trust area 210.

Figure 4:
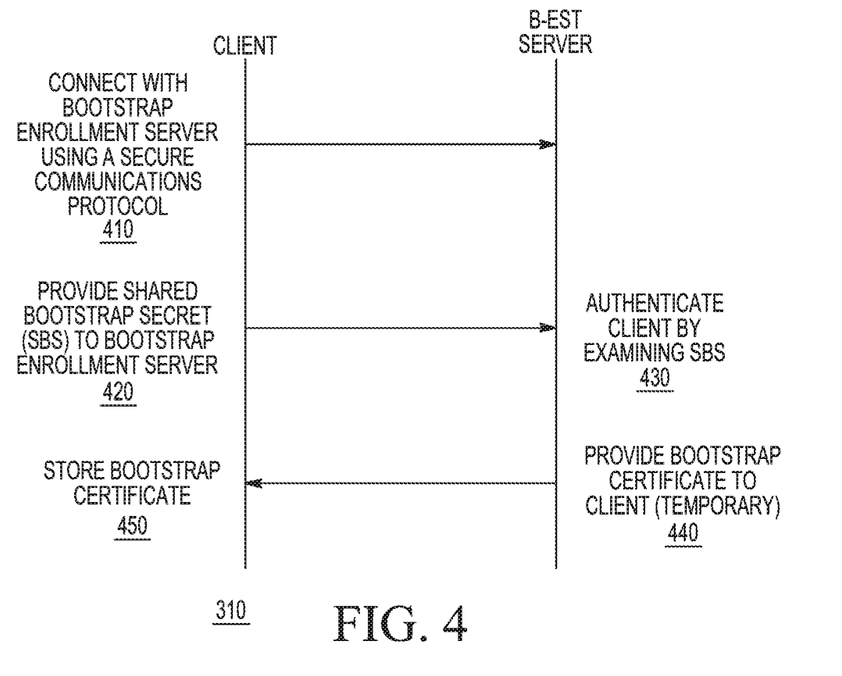
FIG. 4 is a simplified timing diagram illustrating details of a bootstrapping phase in accord with one embodiment of the present invention.
Figure 5:
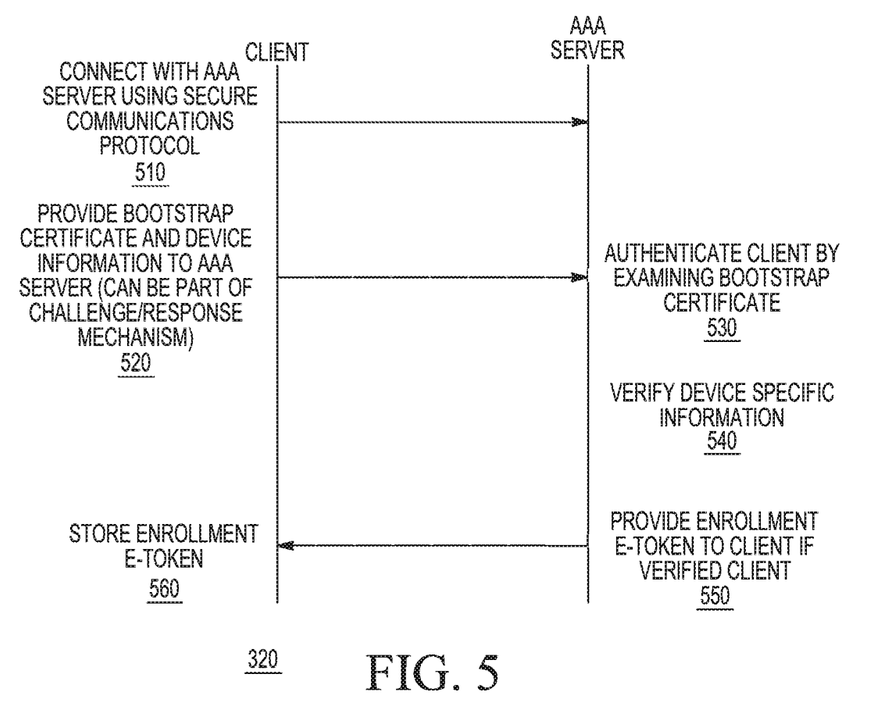
FIG. 5 is a simplified timing diagram illustrating details of an association, authentication, and authorization phase in accord with one embodiment of the present invention.
Figure 6:
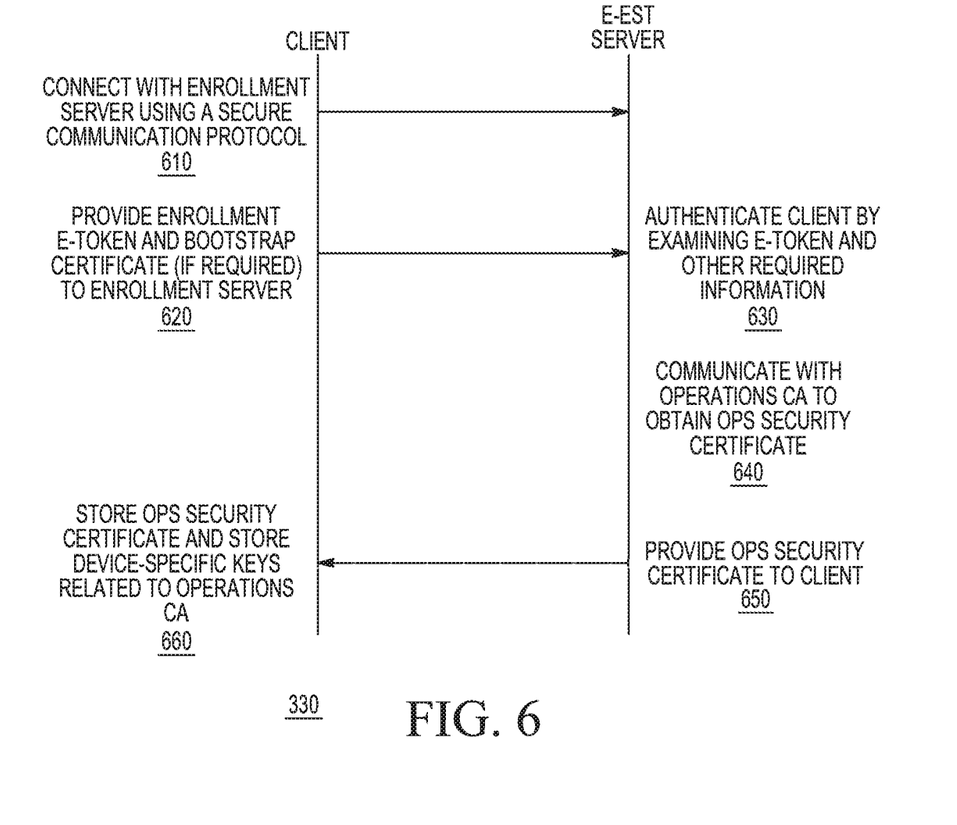
FIG. 6 is a simplified timing diagram illustrating details of an enrollment phase in accord with one embodiment of the present invention.

FIGS. 4-6 provide details on the exchange of communication in the three enrollment phases in accord with embodiments of the present invention.

FIG. 4 is a simplified timing diagram illustrating details of bootstrapping phase 310 in accord with one embodiment of the present invention. The figure illustrates communication between a client device (e.g., network node 110 or edge services node 120) and a B-EST server (e.g., B-EST server 230) during which the client device connects to the B-EST server and obtains a bootstrap certificate for use in Phase 2. Initially, the client device connects with the B-EST server using a secure communications protocol such as TLS/SSL (410). Information necessary for the client device to connect with the B-EST server is programmed into the client device during a secure manufacturing process. Upon connection, the client device can authenticate a connection to the proper server using an enrollment CA certificate that was programmed into the client device during manufacture. The enrollment CA certificate is only used for the bootstrapping phase, and is the only CA cert that is made available to the manufacturer of the client device.

In one embodiment, the client device can proceed with authentication with the B-EST server by providing a shared bootstrap secret (SBS) to the B-EST (420). The SBS is also programmed into the client device during the secure manufacturing process. SBS is one of several mechanisms for authenticating the client device during bootstrapping. Depending upon the architecture of the client device, security tokens could also be used for authentication. Once the information from the SBS is provided to the B-EST server, the B-EST server can authenticate the client device (430). Once the client device is authenticated, the B-EST server can provide the client device with a temporary bootstrap certificate (440), which is stored by the client device for use in the next phase (450). The bootstrap certificate can be temporary to avoid issues associated with hijacking and decrypting the bootstrap certificate to gain access to subsequent phases of the enrollment process.

Phase 1 establishes the secure enrollment process in a separate CA from the operations CA, and therefore helps to fend off attacks on the operations servers (e.g., man in the middle attacks and denial of service attacks). At the end of Phase 1, all client devices, regardless of authentication mechanism (e.g., SBS or token), will be at the same level of readiness for Phase 2 because all authenticated client devices will have received a bootstrap certificate. While the authentication mechanism of Phase 1 is inherently weak, it will be difficult for an attacker to do real damage to the operations systems because the attacker will need to overcome Phase 2 and Phase 3 as well.

FIG. 5 is a simplified timing diagram illustrating details of association, authentication, and authorization phase 320 in accord with one embodiment of the present invention. The figure illustrates communication between the client device (e.g., network node 110 or edge services node 120) and an AAA server (e.g., AAA server 240) during which the client device connects to the AAA server and obtains an enrollment token for use in Phase 3. Initially, the client device connects with the AAA server using a secure communication protocol such as TLS/SSL or HTTPS (510). The communication can be secured using the enrollment CA certificate programmed into the device during manufacture. Identification of the appropriate AAA server can be provided during Phase 1 of the enrollment process or the identification can be programmed into the device during manufacture.

Once connected, the client device can provide the bootstrap certificate obtained in Phase 1 to continue with the authentication of the device with the AAA server (520). All devices that have successfully completed Phase 1 will have an appropriate bootstrap certificate to provide to the AAA server. In addition, the client device can provide device specific information to the AAA server for additional authentication. The device specific information can include, for example, device UID, manufacturer identification, serial number, and other manufacturing information to identify the specific device. The AAA server performs an initial authentication using the bootstrap certificate (530). The bootstrap certificate establishes that the client device is authorized to communicate with the AAA server. The AAA server can then use the device specific information provided by the client device to determine whether the client device is authorized to proceed further with enrollment (540). For example, the AAA server can be provided with information such as a total number of devices from a specific manufacturer allowed to communicate with the operations servers. If the client device information establishes that the device is not within the number of devices, then the AAA server can refuse to provide a security token to proceed to the next step of authorization. Similarly, the client device manufacturer can program security information (e.g., a manufacturing key or additional private keys) into the client device at manufacture time that is authenticated by the AAA server during Phase 2. The security information can be provided to the AAA server by the manufacturer for these checks. If the client device does not provide the correct security information, then the AAA server can refuse to authenticate the device. The types of authorization performed by the AAA server are not limited to the above scenarios and can be flexibly designed to provide as high a level of authentication as the operations services provider or the client device manufacturer desires for the application.

Once the client device is authenticated, the AAA server can provide the client device with a temporary enrollment e-token or certificate (550), which is stored by the client device for use in the next phase (560). As with the certificate provided in Phase 1, the Phase 2 enrollment e-token is temporary to avoid issues associated with hijacking and decrypting the enrollment e-token to gain access to subsequent phases of the enrollment process. The AAA server can maintain a mapping table that contains all active client device IDs to e-token mappings, along with expiration times for the e-tokens. The E-EST server in Phase 3 can use the table to authenticate devices in that Phase.

Phase 2 concludes the vendor-specific authentication and authorization portion of the enrollment process. Once completed, the devices that have been authorized are all in condition for Phase 3 where a long-term operations certificate is issued. The secure communications protocol used in Phase 2 can selected to flexibly allow different client device vendors to present security tokens in different ways. For example, HTTPS can be used to allow for multiple challenge-response cycles occur between the client device and the AAA server. Further, the result of the authentication process can be to direct different manufacturers' devices to different E-EST servers in Phase 3, allowing for issuance of differing operations certificates.

FIG. 6 is a simplified timing diagram illustrating details of enrollment EST phase 330 in accord with one embodiment of the present invention. The figure illustrates communication between the client device (e.g., network node 110 or edge services node 120) and an enrollment EST server (e.g., E-EST server 250) during which the client device connects to the E-EST server and obtains an operations CA certificate for use in accessing cloud services 150 in operations area 210. Initially, the client device connects with the E-EST server using a secure communication protocol such as TLS/SSL or HTTPS (610). The communication can be secured using the enrollment CA certificate programmed into the device during manufacture or the bootstrap certificate received in Phase 1. Identification of the appropriate E-EST server can be provided during Phase 2 of the enrollment process (e.g., as part of the e-token transfer) or the identification can be programmed into the device during manufacture.

Once secure communication is established between the client device and the E-EST server, the client device provides the enrollment e-token the client received in Phase 2 along with any other certificates required by the E-EST server (620). It should be noted that in some cases where securely manufactured client devices are accessing the enrollment process, those devices can be configured with or generate their own enrollment e-tokens or can be pre-programmed with an enrollment e-token. In such cases, those secure client devices can access the E-EST server without going through Phases 1 or 2 and provide the secure client generated or stored e-token to the E-EST server.

After receiving the enrollment e-token information along with any other information required by the E-EST server, the E-EST server authenticates the client device (630). If the information provided by the client device does not clear authentication (e.g., the enrollment e-token has expired), then the E-EST server will not provide a certificate to gain access to the operations services. If the information does clear authentication, then the E-EST server can communicate with the operations CA to acquire a long-term operations security certificate (640) which is then provided to the client device (650). The client device the stores the operations security certificate and can generate device-specific keys related to the operations CA for access to operations services 150 (660).

The three-phase enrollment process provided by embodiments of the present invention provides advantages over previous enrollment mechanisms. The three-phase enrollment process is more secure than previous enrollment mechanisms because only the B-EST CA certificate is distributed to the manufacturers. The E-EST CA certification is never provided except for securely manufactured devices. The Phase 1 EST enrollment enhances security for the next certificate exchanges in the subsequent phases. In addition, the three-phase enrollment provides flexibility in that a variety of devices and architectures can be provided certificates that allow access to subsequent stages. The authentication provided can be device-type specific.

Figure 7:
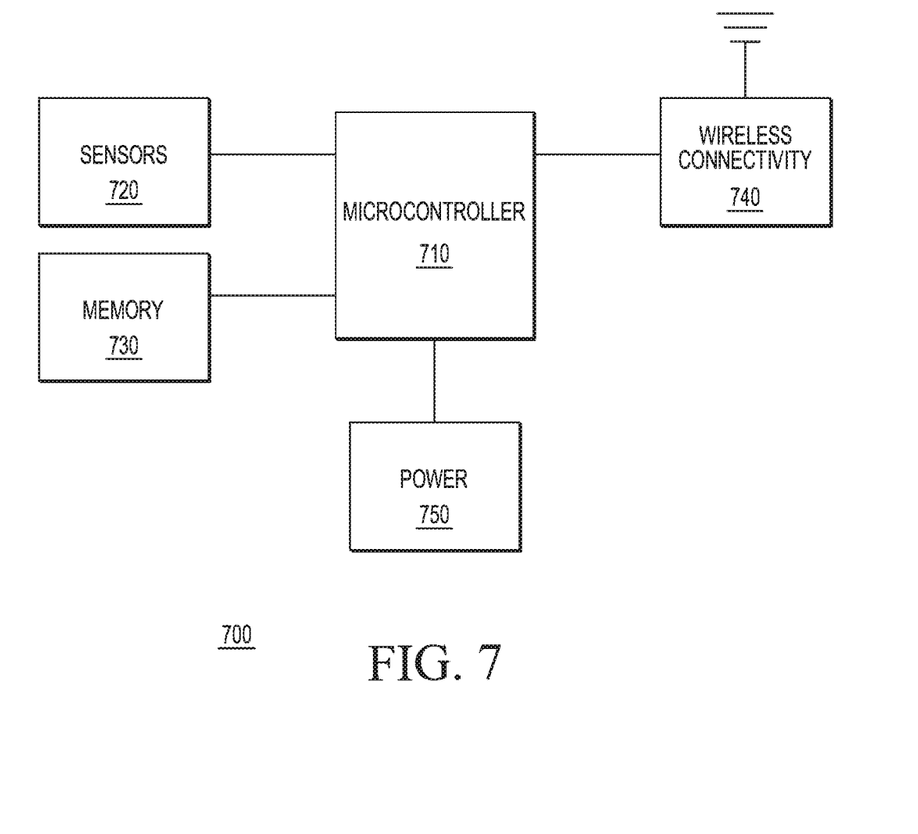
FIG. 7 is a simplified block diagram illustrating components of an example IoT sensor node 700 that can incorporate embodiments of the present invention.

FIG. 7 is a simplified block diagram illustrating components of an example IoT sensor node 700 that can incorporate embodiments of the present invention. IoT sensor node 700 incorporates a microcontroller (MCU) 710 programmed to receive data from sensors module 720 and provide information from that data to other network nodes via wireless connectivity module 740. MCU 710 can be a 8-, 16-, or 32-bit MCU, for example, in which low-to-medium complexity nodes use an 8- or 16-bit MCU, while high complexity nodes use a 32-bit MCU. The choice of MCU type can be dependent upon the data throughput needs and the power constraints of the application, for example. MCUs can have sensor interfaces, voltage regulators, and RF radios on chip, or those devices can be external to the MCU.

Sensors module 720 can include one or more of a variety of sensor types, including, for example, smart sensors, RFID or near field communication, optical sensors, image sensors, environmental sensors, and the like. Smart sensors are sensors that include data processing in the sensor. These can include, for example, environmental sensors that perform simple processing of the collected environmental data, or microelectromechanical systems (MEMS) sensors having a gyroscope and accelerometer with integrated digital processing for sensor fusion calculations. RFID or near field communication sensors can be configured to detect the presence of items identified with a RFID or NFC tag. Optical sensors are used to detect the presence of light in either visible or non-visible wavelengths. Image sensors are light sensitive sensor arrays (e.g., CCD) that translate an image into electrical signals. An environmental sensor is configured to detect the status of the environment around the sensor. Such information can include, for example, pressure, temperature, position, acceleration, motion, or orientation. Sensors in sensor module 720 can provide a digital output that is read by MCU 710.

In addition, sensors module 720 can include inputs for systems that provide an analog signal. In such cases, sensors module 720 can include an analog-to-digital converter (ADC), especially when a high speed or precision conversion is required by the application. Alternatively, in applications where an ADC is insufficient, sensors module 720 can include an analog front end that includes an ADC and signal conditioning circuitry to provide the digital signal to the MCU.

Memory module 730 can provide storage access to MCU 710 over and above the memory on board the MCU. For example, memory module 730 can include RAM or flash or removable memory to store programs for the MCU or other data.

Wireless connectivity module 740 is configured to provide communication between the IoT sensor node and other nodes in the network (e.g., a parent node or a child node). As discussed above, embodiments of the present invention can be used in a wireless mesh network such as that defined by IEEE 802.15.4. Such networks are typically used for low data rate, battery powered nodes distributed over a wide area. The wireless connectivity module can be configured to transmit and receive data with one or more other nodes in the network.

Power module 750 provides the correct voltage to MCU 510 and also manage the battery to help increase battery life and ensure that proper charging current and voltage is applied. Power module 750 can also include low loss voltage regulators and step up/step down voltage converters to help ensure that the IoT sensor node is operating at the correct voltage.

By now it should be appreciated that there has been provided a multi-phase mechanism for enrolling a network device with a network service. One embodiment of this mechanism includes: acquiring by the network device, during a first phase, a first temporary digital certificate from a first network server using first information stored in the network device during manufacture of the network device; acquiring by the network device, during a second phase, one of a second temporary digital certificate or e-token form a second network server using the first temporary digital certificate and second information stored in the network device during manufacture of the network device; and acquiring by the network device, during a third phase, a long-term digital certificate from a third network server using the one of second temporary digital certificate or e-token, wherein the network device is configured to communicate with the network service using the long-term digital certificate.

In one aspect of the above embodiment, the first phase includes communicating with the first network server using a secure communications protocol, transmitting a shared bootstrap secret to the first network server where the first information includes the shared bootstrap secret, and receiving the first temporary digital certificate from the first network server in response to the first network server authenticating the shared bootstrap secret. In a further aspect, connecting with the first network server further includes using information in an enrollment certificate authority (CA) certificate to establish a secure communications link using the secure communications protocol where the first information further includes the enrollment CA certificate.

In another aspect of the above embodiment, the second phase includes communicating with the second network server using a secure communications protocol, transmitting the first temporary digital certificate to the second network server, transmitting the second information stored in the network device to the second network server, and receiving the second temporary digital certificate or e-token from the second network server in response to the second network server authenticating the first temporary digital certificate and the second information. In a further aspect, the second information includes one or more of a unique identifier of the device, a unique identifier of the manufacturer of the device, a unique identifier of the model of the device, and a key generated by the device or programmed securely on the device where a public portion of the key is accessible to the second network server. In another further aspect, the second network server authenticating the second information includes comparing the second information with manufacturer-related information stored at the second network server, and providing said authenticating in response to the second information conforming with the manufacturer-related information. In a still further aspect, comparing the second information with manufacturer-related information stored at the second network server includes associating the network device with a manufacturer of the network device where the second information includes a manufacturer identifier, and determining whether the network device is within an allowable number of devices manufactured by the manufacturer of the network device. In another further aspect, comparing the second information with manufacturer-related information stored at the second network server includes associating the network device with a type of device where the second information includes a device type identifier, and determining whether the network device is within an allowable number of devices of the type of device. In another further aspect, comparing the second information with manufacturer-related information stored at the second network server includes associating the network device with a manufacturer of the network device where the second information includes a secure key associated with the manufacturer, and determining whether the network device is a device from the manufacturer by using a public portion of the secure key stored at the second network server.

In another further aspect, the second network server authenticating the second information includes comparing the second information with user-related information stored at the second network server, and providing the authenticating in response to the second information conforming with the user-related information. In a further aspect, comparing the second information with user-related information stored at the second network server includes associating the network device with a user of the network device where the second information includes a user identifier, and determining whether the network device is within an allowable number of devices registered by the user of the network device.

In another aspect, the third phase includes communicating with the third network server using a secure communications protocol, transmitting the second temporary digital certificate or e-token to the third network server, and receiving the long-term digital certificate from the third network server in response to the third network server authenticating the second temporary digital certificate or e-token. In a further aspect, the long-term digital certificate is provided to the third network server by a certificate authority associated with a network service provider to enable the network device to securely communicate with the network service.

In another aspect, the above embodiment further includes securely communicating with the network service using the long-term digital certificate.

Another embodiment provides a method for enrolling a network device with a network service. The method includes: acquiring, by the network device, a first temporary digital certificate or e-token from a first network server using a second digital certificate and information stored in the network device during manufacture of the network device; and acquiring, by the network device, a long-term digital certificate from a second network server using the first temporary digital certificate or e-token where the network device is configured to communicate with the network service using the long-term digital certificate.

In one aspect of the above embodiment, acquiring the first temporary digital certificate or e-token includes communicating with the first network server using a secure communications protocol, transmitting the second temporary digital certificate to the first network server, transmitting the information stored in the network device to the first network server, and receiving the first temporary digital certificate or e-token from the first network server in response to the first network server authenticating the second temporary digital certificate and the information. In a further aspect, the first network server authenticating the information includes comparing the information with manufacturer-related information stored at the first network server, and providing the authenticating in response to the information conforming with the manufacturer-related information. In a still further aspect, comparing the information with manufacturer-related information stored at the network server includes associating the network device with a manufacturer of the network device where the information includes a manufacturer identifier, and determining whether the network device is within an allowable number of devices manufactured by the manufacturer of the network device. In another further aspect, comparing the information with manufacturer-related information stored at the first network server includes associating the network device with a type of device where the information includes a device type identifier, and determining whether the network device is within an allowable number of devices of the type of device. In another further aspect, the first network server authenticating the information includes comparing the information with user-related information stored at the first network server, and providing said authenticating in response to the information conforming with the user-related information.

In another aspect of the above embodiment, the method further includes acquiring, by the network device, the second temporary digital certificate from a third network server using bootstrap information stored in the network device during manufacture of the network device.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 7 and the discussion thereof describe an exemplary network node architecture, this exemplary architecture is presented merely to provide a useful reference in discussing various aspects of the invention. The description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a functionality can be considered "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of an operation, and the order of operations may be altered in various other embodiments.

All or some of the software described herein may be received elements of system 710, for example, from non-transitory computer readable media such as memory 730 or other media on other computer systems. Such non-transitory computer readable media may be permanently, removably or remotely coupled to the system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

In some embodiments, an edge network can include a computer system such as a personal computer system as a network node. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A multi-phase method for enrolling a network device with a network service, the method comprising:
    acquiring by the network device, during a first phase, a first temporary digital certificate from a first network server using first information stored in the network device during manufacture of the network device, wherein the first phase comprises communicating with the first network server using a secure communications protocol by using information in an enrollment certificate authority (CA) certificate to establish a secure communications link using the secure communications protocol, wherein the first information comprises the enrollment CA certificate;
    acquiring by the network device, during a second phase, one of a second temporary digital certificate or e-token from a second network server using the first temporary digital certificate and second information stored in the network device during manufacture of the network device; and
    acquiring by the network device, during a third phase, a long-term digital certificate from a third network server using the one of second temporary digital certificate or e-token, wherein
        the network device is configured to communicate with the network service using the long-term digital certificate, and
        the long-term digital certificate is provided to the third network server by a certificate authority associated with a network service provider to enable the network device to securely communicate with the network service.

2. The method of claim 1 wherein the first phase further comprises:
    transmitting a shared bootstrap secret to the first network server, wherein the first information comprises the shared bootstrap secret; and
    receiving the first temporary digital certificate from the first network server in response to the first network server authenticating the shared bootstrap secret.

3. The method of claim 1 wherein the second phase comprises:
    communicating with the second network server using a secure communications protocol;
    transmitting the first temporary digital certificate to the second network server;
    transmitting the second information stored in the network device to the second network server;
    receiving the second temporary digital certificate or e-token from the second network server in response to the second network server authenticating the first temporary digital certificate and the second information.

4. The method of claim 3 wherein the second information comprises one or more of
    a unique identifier of the device;
    a unique identifier of the manufacturer of the device;
    a unique identifier of the model of the device; and
    a key generated by the device or programmed securely on the device, wherein a public portion of the key is accessible to the second network server.

5. The method of claim 3 wherein the second network server authenticating the second information comprises:

comparing the second information with manufacturer-related information stored at the second network server;
providing said authenticating in response to the second information conforming with the manufacturer-related information.

6. The method of claim 5 wherein said comparing the second information with manufacturer-related information stored at the second network server comprises:
associating the network device with a manufacturer of the network device, wherein the second information comprises a manufacturer identifier; and
determining whether the network device is within an allowable number of devices manufactured by the manufacturer of the network device.

7. The method of claim 5 wherein said comparing the second information with manufacturer-related information stored at the second network server comprises:
associating the network device with a type of device, wherein the second information comprises a device type identifier; and
determining whether the network device is within an allowable number of devices of the type of device.

8. The method of claim 5 wherein said comparing the second information with manufacturer-related information stored at the second network server comprises:
associating the network device with a manufacturer of the network device, wherein the second information comprises a secure key associated with the manufacturer; and
determining whether the network device is a device from the manufacturer by using a public portion of the secure key stored at the second network server.

9. The method of claim 3 wherein the second network server authenticating the second information comprises:
comparing the second information with user-related information stored at the second network server; and
providing said authenticating in response to the second information conforming with the user-related information.

10. The method of claim 9 wherein said comparing the second information with user-related information stored at the second network server comprises:
associating the network device with a user of the network device, wherein the second information comprises a user identifier; and
determining whether the network device is within an allowable number of devices registered by the user of the network device.

11. The method of claim 1 wherein the third phase comprises:
communicating with the third network server using a secure communications protocol;
transmitting the second temporary digital certificate or e-token to the third network server;
receiving the long-term digital certificate from the third network server in response to the third network server authenticating the second temporary digital certificate or e-token.

12. The method of claim 1 further comprising:
securely communicating with the network service using the long-term digital certificate.

13. A method for enrolling a network device with a network service, the method comprising:
acquiring, by the network device, a first temporary digital certificate or e-token from a first network server using a second temporary digital certificate and information stored in the network device during manufacture of the network device, wherein said acquiring the first temporary digital certificate or e-token comprises
communicating with the first network server using a secure communications protocol by using information in an enrollment certificate authority (CA) certificate to establish a secure communications link using the secure communications protocol, wherein the information stored in the network device comprises the enrollment CA certificate,
transmitting the second temporary digital certificate to the first network server,
transmitting the information stored in the network device to the first network server,
receiving the first temporary digital certificate or e-token from the first network server in response to the first network server authenticating the second temporary digital certificate and the information, wherein
the first network server authenticating the information comprises comparing the information with manufacturer-related information stored at the first network server and providing said authenticating in response to the information conforming with the manufacturer-related information, and
said comparing the information with manufacturer-related information stored at the first network server comprises one of
associating the network device with a manufacturer of the network device wherein the information comprises a manufacturer identifier and determining whether the network device is within an allowable number of devices manufactured by the manufacturer of the network device, and
associating the network device with a type of device wherein the information comprises a device type identifier and determining whether the network device is within an allowable number of devices of the type of device; and
acquiring, by the network device, a long-term digital certificate from a second network server using the first temporary digital certificate or e-token, wherein the network device is configured to communicate with the network service using the long-term digital certificate.

14. The method of claim 13 further comprising:
acquiring, by the network device, the second temporary digital certificate from a third network server using bootstrap information stored in the network device during manufacture of the network device.

15. The method of claim 13 wherein said comparing the information with manufacturer-related information stored at the first network server further comprises:
associating the network device with a manufacturer of the network device, wherein the information comprises a secure key associated with the manufacturer; and
determining whether the network device is a device from the manufacturer by using a public portion of the secure key stored at the first network server.

* * * * *